(12) United States Patent
Jäger et al.

(10) Patent No.: US 6,834,221 B2
(45) Date of Patent: Dec. 21, 2004

(54) METHOD OF OPERATING A MOTOR VEHICLE

(75) Inventors: Thomas Jäger, Meckenbeuren (DE); Klaus Henneberger, Bül (DE); Martin Zimmermann, Sasbach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/012,694

(22) Filed: Dec. 7, 2001

(65) Prior Publication Data

US 2002/0091472 A1 Jul. 11, 2002

Related U.S. Application Data

(63) Continuation of application No. PCT/DE00/01832, filed on Jun. 2, 2000.

(30) Foreign Application Priority Data

Jun. 8, 1999 (DE) .......................................... 199 26 022

(51) Int. Cl.[7] .............................................. B60K 41/04
(52) U.S. Cl. ...................................................... 701/34
(58) Field of Search ........................ 701/34, 29, 74–75, 701/82–83, 90

(56) References Cited

U.S. PATENT DOCUMENTS

| | | |
|---|---|---|
| 3,866,980 A | 2/1975 | Eisele et al. |
| 4,497,026 A | 1/1985 | Braschel et al. |
| 4,651,281 A | 3/1987 | Masaki et al. |
| 4,675,819 A | 6/1987 | Fennel |
| 4,760,893 A | 8/1988 | Sigl et al. |
| 4,805,447 A | 2/1989 | Meguro et al. |
| 4,899,279 A | 2/1990 | Cote et al. |
| 5,729,476 A | 3/1998 | Pfau |
| 5,896,083 A | * 4/1999 | Weisman et al. ........... 340/438 |
| 6,151,543 A | * 11/2000 | McKee et al. ................ 701/55 |

FOREIGN PATENT DOCUMENTS

| | | | |
|---|---|---|---|
| DE | 2754126 | 6/1979 | |
| DE | 2918543 | 11/1979 | |
| DE | 3932568 A | 4/1991 | |
| DE | 4122484 A1 | 1/1993 | |
| EP | 3932568 | * 9/1989 | ............. B60T/8/32 |
| EP | 0799740 | * 8/1997 | ........... B60K/23/08 |
| EP | 0799740 A2 | 10/1997 | |

* cited by examiner

Primary Examiner—Thu V. Nguyen
(74) Attorney, Agent, or Firm—Darby & Darby

(57) ABSTRACT

The method is designed for a motor vehicle equipped with wheel rpm sensors and means to determine whether the wheels are either rolling normally or locked or spinning without adhesion. The method employs plausibility routines to determine whether an abnormal wheel rpm sensor signal is due to locking or spinning of the wheel or whether it is due to a sensor failure. In case that an abnormal condition is detected, an alternate strategy is initialized to determine wheel rpm rates and perform control functions that are based on wheel rpm rates.

65 Claims, 7 Drawing Sheets

METHOD OF OPERATING A MOTOR VEHICLE

CROSS-REFERENCE TO RELATED APPLICATIONS

This is a continuation of international application Ser. No. PCT/DE00/01832, filed Jun. 2, 2000, published in German and now abandoned, the entire disclosure of which is hereby incorporated by reference.

BACKGROUND OF THE INVENTION

The present invention relates to a method of operating a motor vehicle with an engine, at least one drive axle with at least one wheel, a torque transfer system between the engine and the drive axle, and a wheel rpm sensor device.

The invention further relates to a method of operating a motor vehicle which, in addition to the aforementioned elements, is further equipped with a control device.

An engine in the context of the present invention is an internal combustion engine such as a gasoline or diesel engine.

A torque transfer system in the sense of the present invention is an arrangement with the capability to convert a rotary input quantity of an input shaft into an identical or different rotary output quantity of an output shaft and/or with the capability to couple and uncouple the input shaft and the output shaft. A torque transfer system can include a clutch device and/or a transmission device and/or a torque converter device or any other mechanism in the same general category.

A transmission device in the sense of the present invention is a mechanism that can be shifted in steps or in a continuous, step-less range into different shift positions corresponding to different transmission ratios between two shafts of the transmission device. The transmission device can be shifted automatically or manually, or in a partially automatic or automated mode with the possibility of manual intervention, or in some other way. Depending on the design of the transmission device, the shifts may be performed with or without an interruption in vehicle traction.

A transmission device in the sense of the present invention encompasses in particular manually operated step-shifting transmissions, or cone-pulley transmissions, or automatic transmissions, or automated step-shifting transmissions or the like.

An automatic transmission in the present context is a transmission device in which the shifts are controlled automatically and occur without interruption in the tractive force, specifically with a planetary gear mechanism.

The term "automated shift transmission" relates to a transmission device that allows automatic shifting between different shift positions and is characterized by an interruption in vehicle traction during the shift processes.

A rotary input/output quantity or other characteristic rotary quantity is used to characterize the dynamic situation of a rotating part, particularly a shaft. Specific examples of characteristic rotary quantities are a torque or an rpm rate.

A clutch device in the sense of the present invention encompasses torque-coupling devices configured as a friction clutch, a start-up clutch, a reverse-gear clutch, a magnet-powder clutch, a converter bypass clutch, or any other device of the same general category. The term "clutch device" in the present context relates in particular to an electronically controlled clutch device in which the movement between different positions of the clutch can be performed under electronic control.

A specific example of an electronically controlled clutch device is represented by a device which has been described by and is available from the assignee of the present invention under the name "Electronic Clutch Management (ECM)".

A wheel rpm sensor device can detect wheel rpm rates either at discrete time intervals or continuously.

State-of-the-art methods of operating a motor vehicle are known in which the rpm rate of at least one wheel of the motor vehicle is detected by a sensor device. The detected wheel rpm rates are used to calculate the speed of the vehicle or to control the actuation of a clutch in an electronically controlled clutch device, or similar processes.

The detection of wheel rpm rates is a proven concept, having been used for many years. Experience has likewise been positive and improvements have been achieved by using the detected wheel rpm rates for the management of electronically controlled clutch devices, as this concept allows for example certain engagement positions of the clutch device to be determined without the use of an additional sensor on the transmission input- or output shaft. For example the amount of torque transmitted through the clutch device can be determined based on the engine torque, the engine rpm rate, a wheel rpm rate, and the transmission ratio.

However, experience has also shown that there can be malfunctions in the detection of wheel rpm rates, particularly in case of a failure of a wheel rpm sensor. As a consequence of these errors, a wrong vehicle speed may be calculated, or clutch and transmission movements may be performed incorrectly.

The detected wheel rpm rates are further used in many control applications with the implied assumption that the vehicle is traveling at a speed according to the functional relationship between vehicle speed and wheel rpm rate.

Experience has also shown that this assumption is not always justified.

OBJECT OF THE INVENTION

The present invention therefore has the objective of providing a method of operating a motor vehicle, as well as providing a motor vehicle, with a means to recognize functional impairments in wheel rpm sensors, to distinguish reliable rpm rates that may be used for calculating vehicle speed or similar information from non-reliable rpm rates that cannot be used for assuring the operating safety of the vehicle. It is also part of the objective, after a detected wheel rpm rate has at some point been found to be non-reliable, to determine when it is safe again to use that detected rpm rate for control purposes or other critical uses, or to determine when a malfunctioning wheel rpm sensor device has regained its functionality.

SUMMARY OF THE INVENTION

To meet the foregoing objective, the invention proposes a method of operating a motor vehicle in which a determination is made whether a wheel is rolling, or spinning with slippage, or locked, and/or whether or not the wheel rpm sensor device is functioning properly. When making this determination, a substitute wheel rpm rate value is calculated and compared with the detected wheel rpm rate.

With particular preference, this comparison is used to determine whether or not the wheel rpm sensor device is functionally impaired, and whether the respective wheel is rolling, spinning with slip, or locked up.

In the inventive method, at least one first characteristic operating value of the motor vehicle or specifically of a wheel of the vehicle is determined, monitored and/or evaluated in order to identify implausible wheel rpm rates and distinguish them from plausible wheel rpm values.

A plausible wheel rpm rate in the sense of the present invention means in particular an rpm rate that conforms to a predetermined functional relationship with the vehicle speed, which may be expressed by the equation v=C×n/60, where v stands for the vehicle speed in meters per second, C for the wheel circumference in meters, and n for the wheel rpm rate, i.e., the number of revolutions per minute. According to this equation, a wheel rpm rate is plausible if the wheel is rolling without slippage, or if the vehicle is standing still and the wheel is not turning.

In the present context, a detected wheel rpm rate would be referred to as implausible in one of the following cases: if a wheel rpm rate is correctly detected but the wheel is not rolling (meaning that it is spinning without gripping the pavement), or if a wheel rpm rate of zero is detected while the vehicle is in motion, or if an rpm rate other than zero is detected while the vehicle is standing still, or if there are discrepancies between the actual and the detected or indicated wheel rpm rate.

In the present context, the terms "plausible" and "implausible" may be applied to either the actual or the detected wheel rpm rate.

Under the inventive method, after a wheel rpm rate has been found to be implausible, at least one second characteristic operating value of the vehicle and/or of a wheel is monitored. This monitoring activity serves to determine whether the wheel rpm rate remains implausible, and/or whether as well as when the wheel rpm rate becomes plausible again.

The aforementioned second characteristic operating value is preferably monitored if the wheel rpm rate was found to be plausible, in order to determine if, and possibly when, the wheel rpm rate becomes implausible, or whether the wheel rpm rate remains plausible.

Under the inventive method, the first and second characteristic operating values can be either identical, or they can be different values. If several first or several second characteristic operating values are used, the several values can also be identical or different.

Specific examples of characteristic operating values in the sense of the present invention are a wheel rpm rate detected by a wheel rpm sensor device, an actual wheel rpm rate, a time gradient of an rpm rate, or a theoretical maximum or minimum rpm rate that may be predicted to occur within a certain time interval based on physical facts, or the differences between the actual or detected rpm rate and the aforementioned theoretical maximum and minimum rpm rates.

The terminology "based on physical facts" in the present context means in particular that the laws of physics have to be adhered to in making calculations or predictions. For example, if the engine power, the transmission ratio, a certain amount of friction and other physical factors are taken into account, the wheel rpm rate can change by no more than a certain maximum amount that can be calculated based on the laws of physics.

As a preferred concept of the invention, a wheel rpm rate determined by a wheel rpm sensor device is used as a first characteristic operating value, and a maximum rpm change that is possible within a given time period based on physical facts is used as a second characteristic operating value.

The inventive method preferably includes a determination as to whether a wheel is spinning without gripping the pavement or is locked up, or whether a wheel rpm detection device has a functional impairment, after a wheel rpm rate was found to be implausible.

The inventive method includes the concept of determining under predetermined conditions, whether or not a given wheel of the vehicle is in a rolling state. This determination is made in particular while the vehicle is in motion or while a fuel-metering device such as a gas pedal is being actuated. If the wheel is found to be in a non-rolling state, a substitute wheel rpm rate is determined or calculated. The substitute wheel rpm rate is used in particular in order to actuate the vehicle or to determine or monitor the state of rotation of the wheel and/or to check the functionality of the wheel rpm sensor device.

With regard to the aforementioned actuation of the vehicle, the substitute wheel rpm rate may be used to actuate the clutch device or the transmission device. With particular preference, the substitute wheel rpm rate is used to actuate or control an electronically controlled clutch device and/or an automated shift transmission.

A state of rotation of a wheel in the present context refers to the different states of motion of the wheel, i.e., that the wheel is turning or not turning, that the wheel is rolling, or spinning with slip, or that the wheel is locked up.

In accordance with the invention, the time gradient of at least one wheel rpm rate is determined and/or monitored. Based on the detected rpm gradient and by using at least one predetermined functional limit for the rpm gradient, the functionality of the wheel rpm sensor device is checked or confirmed.

A functional limit for the rpm gradient in the sense of the present invention is a maximum or minimum rpm gradient that the rotary acceleration or deceleration of a wheel cannot exceed or fall below based on physical facts.

With preference, a functional impairment of the wheel rpm sensor device is registered if a wheel rpm gradient exceeds an upper functional limit of falls below a lower functional limit. With special preference, the upper limit is represented by a positive value and the lower limit by a negative value.

According to a concept of the invention, the time gradient of a wheel rpm rate is monitored. After detecting an rpm rate, a determination is made whether the wheel is turning, dependent on the wheel rpm gradient and at least two predetermined limits for the wheel rpm gradient. The predetermined limits for the wheel rpm gradient are calculated based on a predetermined characteristic. A first limit of the wheel rpm gradient represents an upper limit, and a second limit of the wheel rpm gradient represents a lower limit for rpm gradients that are physically compatible with a rolling condition of the wheel.

The terminology "compatible with a rolling condition" means that the wheel rpm gradient is between a maximum and a minimum value of a range where the wheel remains in a rolling condition and does not lose its grip on the pavement. In particular the upper limit of the rolling-compatible wheel rpm gradient represents the maximum rotational acceleration that may not be exceeded if the wheel is not to start spinning with slip. The lower limit of the rolling-compatible wheel rpm gradient represents in particular the maximum rotational deceleration that may not be exceeded if the wheel is to be prevented from locking up.

In accordance with the invention, a wheel is found to be in a rolling condition if the detected time gradient of the wheel rpm rate is between the upper and lower limits of the range of rpm gradients that are compatible with a rolling condition.

In mathematical terms, the upper limit of the rpm gradient that is compatible with a rolling condition is determined so that when the limit has been found to be exceeded, the wheel rpm rate will meet the inequality $v<C\times n/60$, where v stands for the vehicle speed in meters per second, C for the wheel circumference in meters, and n for the wheel rpm rate, i.e., the number of revolutions per minute.

The lower limit of the rpm gradient that is compatible with a rolling condition is determined so that when a wheel rpm gradient has been found below the limit, the wheel rpm rate will meet the inequality $v>C\times n/60$, where v stands for the vehicle speed in meters per second, C for the wheel circumference in meters, and n for the wheel rpm rate, i.e., the number of revolutions per minute.

In accordance with a particularly preferred embodiment of the invention, a wheel is found to be in a rolling condition if the detected time gradient of the wheel rpm rate is between the upper and lower limits of the range of rpm gradients that are compatible with a rolling condition, and if additional predetermined conditions are met.

The additional requirement that predetermined conditions have to be met assures that a wheel rpm rate is not mistakenly found plausible on the basis of the wheel rpm gradients in a case where the wheel rpm rate is in fact implausible.

As an example, a strong increase of the wheel rpm gradient could lead to the conclusion that the wheel is spinning with slippage on the pavement. If the wheel rpm gradient subsequently decreases or becomes zero, the interpretation would be that the wheel rpm rate has become plausible again, if the plausibility is judged only by comparing the detected wheel rpm gradient with an rpm gradient limit. However, it is possible that the wheels continue to race in a slipping condition regardless of the small or decreasing wheel rpm gradient.

Errors of the aforementioned kind in determining the plausibility of a wheel rpm rate can be avoided through the inventive method.

According to a preferred embodiment of the invention, a wheel is found to be in a rolling condition if the detected time gradient of the wheel rpm rate is between the upper and lower limits of the range of rpm gradients that are compatible with a rolling condition, and if in the last preceding detection cycle the wheel was also found to be rolling. In particular, the inventive method uses the concept of continuously monitoring the wheel rpm gradient.

If at some point the wheel was found to be rolling and if there has been no subsequent finding of a non-rolling condition, the wheel can be assumed to still be in a rolling state if in a subsequent comparison of the wheel rpm gradient with a gradient limit, the wheel rpm gradient is found to be between the upper and lower limit of compatible wheel rpm gradients.

Preferably, the upper limit of wheel rpm gradients compatible with a rolling condition is stated as a positive numerical value, while the lower limit is stated as a negative numerical value.

According to a particularly preferred embodiment of the invention, the upper limit of the wheel rpm gradient is calculated on the basis of the current engine torque and the current overall transmission ratio between the engine and the driving axle.

Preferably, the upper limit of the wheel rpm gradient is calculated on the basis of the current engine torque and the current overall transmission ratio between the engine and the driving axle, also taking into account the current level or the maximum level of engine power.

With preference, the upper and lower limits of the wheel rpm gradient are determined on the basis of a possible range of characteristic curves of the engine.

Preferably, the lower limit of wheel rpm gradients that are compatible with a rolling condition of a wheel is determined on the basis of the maximum possible braking performance of the vehicle, particularly under optimum road conditions, i.e., conditions that are conducive to braking the vehicle with the highest possible deceleration while the wheels remain in a rolling state, and most specifically without any locking of the wheels. The lower limit of compatible wheel rpm gradients is preferably set as a function of a predetermined coefficient of friction between the wheel and a driving surface.

Preferably, at least one of the limits of the range of compatible rpm gradients is determined as a function of at least one characteristic value of the vehicle or by taking said value into account in the determination of at least one range limit.

As a preferred example of the foregoing concept, the characteristic value of the vehicle is the inertial force or moment by which one or more elements of the power train oppose a movement of the vehicle.

Also with preference, the engagement position of the clutch device and/or the shift position of the transmission device are taken into account in determining at least one of the limits of a range of compatible rpm gradients.

The last mentioned concept takes into account that with a given amount of engine power and engine torque, the acceleration or time gradient of the wheel rpm rate can be different for different shift positions of the transmission.

The same concept further allows to take into consideration that with given amounts of engine power and engine torque as well as a given shift position of the transmission, the maximum possible rpm gradient takes on different values depending on whether the clutch is in a slipping condition or in a completely engaged condition.

With preference, the upper limit of compatible rpm gradients is determined in each case dependent on a current wheel rpm rate or a current vehicle speed. In addition, the current shift position of the transmission device can be taken into account.

In a particularly preferred embodiment of the invention, the current traction load condition of the vehicle is taken into account in determining a range limit for the compatible wheel rpm gradients. The term "current traction load condition" in the present context refers to the totality of influence factors that affect the movement of the vehicle, for example the gross vehicle weight, the presence or absence of a trailer or accessory structures, the slope angle of the road and whether the vehicle is traveling uphill or downhill, or any other factors that either increase or reduce the amount of resistance encountered by the vehicle.

At each point in time, the applicable limits for the wheel rpm gradient can be set as a function of at least one current characteristic operating value, i.e., a momentary operating value that varies while the vehicle is traveling and applies to the same point in time as the currently present wheel rpm gradient; or the applicable limits for the wheel rpm gradient can be set as a function of at least one characteristic operating value that is applicable at a point in time other than the time at which the wheel rpm gradient is being determined.

With preference, at least one of the limits of the wheel rpm gradient depends on at least one characteristic operating value of the motor vehicle where the respective limit of the wheel rpm gradients takes on a predetermined extreme value, i.e., a maximum or a minimum, in accordance with a predetermined characteristic.

According to a particularly preferred embodiment of the invention, when comparing wheel rpm gradients against gradient limits, or when comparing wheel rpm rates against rpm rate limits determined in function the rpm gradient limits, only those rpm rates or rpm gradients are considered that were detected during a time interval from a first to a second wheel rpm rate in which the wheel rpm rates changed monotonically and the difference between the first and second wheel rpm rate exceeded a predetermined minimum difference.

With preference, when determining changes of wheel rpm rates or calculating maximum possible changes of wheel rpm rates, a predetermined offset value is added to the mathematically calculated maximum possible change of wheel rpm rates. The offset value may be either a constant or a variable value, determined in particular according to a predetermined characteristic.

This serves to prevent the possibility that noise in the wheel rpm signal interferes with the reliable determination of the state of wheel rotation. In particular, this concept provides assurance that a wheel will not be signaled as spinning out of control or as locked up when the wheel is in fact in a rolling condition.

According to a particularly preferred embodiment of the invention, a substitute wheel rpm rate is used to operate the vehicle, to monitor and detect the state of rotation of a wheel, or to monitor the function of a wheel rpm sensor device, for a length of time until the wheel is found to have regained a rolling condition. A substitute wheel rpm rate is used in particular if a wheel rpm rate has been found to be implausible.

A substitute wheel rpm rate used according to the invention can have a constant value or it can be variable over time according to a predetermined characteristic.

With particular preference, a substitute wheel rpm rate is at first set at a substitute rpm starting value according to a predetermined characteristic.

In particular, the substitute wheel rpm rate can be set at the substitute rpm starting value if the wheel has been found to be in a non-rolling condition, or if the wheel rpm rate is implausible, or at the time when the method is initialized.

It should be noted that the range of preferred possibilities of the invention includes using a substitute wheel rpm rate even in cases where the detected wheel rpm rates have been found to be plausible.

According to a particularly preferred embodiment of the invention, the substitute wheel rpm starting value is set so as to correspond to the last previous rpm rate that was found to be plausible, i.e., an rpm rate that was determined to be plausible the shortest possible time before a current selection or use of a wheel rpm rate.

According to a particularly preferred embodiment of the invention, if a substitute wheel rpm rate is used, the latter is incrementally changed from an rpm starting value and/or from a last prior plausible substitute wheel rpm rate, i.e., a substitute wheel rpm rate that was determined to be plausible the shortest possible time before.

With preference, the substitute wheel rpm rate is incrementally change after the presence of implausible wheel rpm rates has been detected.

With special preference, the substitute wheel rpm rate and/or the substitute rpm starting value is incrementally raised if the substitute wheel rpm rate or the substitute rpm starting value is smaller than an implausible wheel rpm rate; or incrementally lowered if the substitute wheel rpm rate or the substitute rpm starting value is larger than the implausible wheel rpm rate.

With special preference, the size of the increment or increments by which the substitute wheel rpm rate or the substitute wheel rpm starting rate is changed is set as a function of one of the wheel rpm gradient limits according to a predetermined characteristic.

With preference, the status of rotation of a wheel is determined by means of the rpm sensor device or by using a substitute wheel rpm rate.

Preferably, a new substitute wheel rpm rate is determined by starting from a plausible starting wheel rpm rate, so that the new substitute wheel rpm rate has a predetermined functional dependency on the upper or lower limit for rpm gradients that are compatible with a rolling condition, and/or on an upper or lower limit for rpm gradients that are compatible with proper functioning of the vehicle. The starting rpm rate can be a wheel rpm rate that has been found to be plausible, or a last previous substitute wheel rpm rate (old rpm rate) or an rpm starting value, or any other appropriate rpm rate. In particular the old substitute wheel rpm rate or the rpm starting rate is presumed to be plausible.

With preference, the new substitute wheel rpm rate is assumed a priori to be plausible, so that in a next cycle of the method, the previous new substitute wheel rpm rate can be set as the old substitute wheel rpm rate from which, in turn, a new substitute wheel rpm rate is again determined.

With preference, at least one substitute wheel rpm rate is established under predetermined conditions in such a manner that a predetermined limit value of the wheel rpm gradient is multiplied by a predetermined length of time, and the product is added to a plausible starting rpm rate. The predetermined length of time represents in particular an interval that starts at the point in time at which the plausible starting rpm rate was present. The limit of the wheel rpm gradients is in particular the upper or lower limit of rpm gradients that are compatible with proper functioning of the vehicle or with a rolling condition of the wheels.

With particular preference, at least one substitute wheel rpm rate is formed in such a manner that a predetermined limit value of the wheel rpm gradient is multiplied by a predetermined length of time, the product is added to a plausible starting rpm rate, and an offset value is added to the sum. The offset value has the same sign (i.e., positive or negative) as the limit of the wheel rpm gradient.

The foregoing way of determining the substitute wheel rpm rate is distinguished from the preceding way by the addition of an offset value for the purpose of at least reducing the influence of noise on the rpm signal.

In a graph of a wheel rpm rate vs time, a limit for the plausible rpm rates within a given time interval following a given point in time is found by extrapolating the rpm rate at the given point by a vector whose slope represents an rpm gradient limit and whose length extends over the given time interval, and by adding the offset value, preferably a constant rpm value.

With preference, a new wheel rpm rate determined at the end of the given time interval is compared to the limit value found according to the foregoing extrapolation method. The comparison is used as a criterion to determine whether the wheel is spinning with slippage, locked up, or rolling, and whether or not a functional impairment of the wheel rpm sensor device is present.

In accordance with a particularly preferred embodiment of the invention, the inventive method is repeated in continuous cycles, so that the state of rotation of a wheel can be monitored continuously.

Thus, the inventive method makes it possible to determine whether a wheel rpm rate that was found to be implausible continues to be implausible in a subsequent cycle or returns to a plausible value.

According to a particularly preferred embodiment of the invention, several substitute rpm values are made up for the purpose of monitoring and determining the state of rotation of a wheel. Substantially all of the substitute wheel rpm rates are used at the same time or within the same cycle in order to determine the state of rotation more accurately.

In particular this allows the detected wheel rpm rate changes to be compared to the rolling-compatible limits as well as the functional limits for rpm gradients and to thereby determine whether a decline of the rpm rate was too rapid, which would indicate a functional impairment of the sensor device, or to determine whether a wheel is locked or rolling, or spinning, or whether a functional impairment of the wheel rpm sensor device exists, based on an excessive increase of the wheel rpm rate.

According to a preferred embodiment of the invention, a status of rotation is accepted as valid information only if the same status has been found in several successive cycles, e.g., three times in a row.

With particular preference, the wheel rpm gradients are determined as mean values over a predetermined time interval. A mean rpm gradient is calculated by subtracting the rpm rate at the beginning from the rpm rate at the end of the time interval and dividing the difference by the length of the time interval.

With preference according to the invention, a wheel is found to be spinning only if the engine torque is larger than a predetermined amount, in particular larger than zero.

As a preferred concept, a determination that a wheel is locked up can occur only if the brake device, specifically the service brake device, was actuated at the time when the wheel rpm rate was detected.

According to the invention, information concerning at least one signal of relevance for the safety of the vehicle is also made available after resetting the control device.

In the present context a signal that is relevant to the safety of the vehicle is understood to be a signal that has a significant influence on the operating or traveling state of the vehicle, or a signal whose absence or defectiveness will impair the operating and driving safety, especially of the engine, to a significant extent.

A reset of the control device in the present context represents an activity or event that can erase the contents of a working memory of the control device, as can occur in particular with even a short interruption of the power supply to the control device.

In the present embodiment of the invention, the information that is made available after a reset of the control device relates to an error condition of a wheel rpm signal.

As a matter of good practice, especially in case the wheel rpm rate signal has an error, information concerning at least one other safety-related signal is made available after a reset of the control device.

As an advantageous concept, the information about at least one other safety-related signal in the present embodiment relates to or represents a currently set ratio of the transmission. It can also be advantageous to make only this latter item of information available after a reset of the control device. In other embodiments, it can further be advantageous to also make information available concerning other signals either individually or in combination, e.g., information concerning vehicle speed, engine rpm rate and/or the degree of engagement of a clutch.

Particularly preferred is a version of the inventive method in which the aforementioned information is stored in a non-volatile memory device such as an EEPROM or a device performing the same function as an EEPROM, so that the information remains available even after a reset of the control device. Within this concept, it may be advantageous if the information is stored in a non-volatile memory that belongs to a portion of the control device performing a function that is associated with the respective information. For example, a signal concerning a transmission ratio is stored in a non-volatile memory that belongs to the portion of the control device that is used for setting the transmission ratio. In another embodiment, it can also be advantageous if the information about a signal is stored in another portion of the control device that is connected to the portion performing the respective control function, e.g., through a bus system such as a CAN (Central Area Network) bus. Another advantageous embodiment allows information to be stored at any one of a number of storage locations that are connected to each other through an appropriate network protocol. The selection of a storage location is made in a practical way based on available memory with suitable access time and/or length of connection and/or memory volume.

It is advantageous if information is stored at or before the time when a critical situation occurs. A critical situation is one in which an interruption in the power supply and thus a reset of the control device has to be anticipated or is likely to occur. It can for example be practical to store information concerning the aforementioned signals in a non-volatile memory before allowing power to flow to the starter, because the temporary voltage drop caused by the use of the starter creates the risk of a reset of the control device; or it can be practical to store the information in a non-volatile memory in case of problems with the battery of the vehicle and/or with the alternator, e.g., triggered by the same signal that is sent to the charge indicator on the dashboard, because there is an increased risk of a power interruption of the control device. The storing of information may also be triggered by a switch on the hood of the engine compartment, because the power supply may be interrupted if the battery is disconnected from the on-board electric system.

It is advantageous if the information stored in the non-volatile memory is returned to the control device if the latter has been reset and subsequently restarted. However, as a practical consideration, the information in the volatile memory is preferably used only if it was stored completely and without error. To assure that this condition is met, a storage location of the non-volatile memory is preferably reserved for information on whether the storage process for the information was complete and error-free. If the storage was not complete and error-free, or if the completeness and absence of errors cannot be verified, it is appropriate not to retrieve the stored information, but to generate a new set of information. In another embodiment, it can be advantageous if an incomplete or incorrect storage of information in the non-volatile memory is recognizable from external input signals. For example, an engine rpm rate or an ignition signal can provide information on whether the control device was reset without storing information in the non-volatile memory. Of course, when information is referred to as not completely stored, this includes the possibility that it was not stored at all.

It should be noted that the preferred methods according to the invention employ the concept of comparing detected rpm gradients to limit values for rpm gradients. However the scope of preferred concepts also includes comparing detected rpm rate changes to limit values for compatible rpm rate changes. With preference, rpm changes over a predetermined time interval are compared to given limits for rpm changes over the predetermined time interval. The limits represent in particular an upper and lower limit for rpm gradients or changes that are compatible with a rolling condition of a wheel and/or with the proper functioning of the devices involved in determining the rpm rates and gradients.

As a linguistic formality, where the names of features are connected by the word "or", this should be understood in the broadest sense, i.e., either as a logic type of "or" (one or the other or both) or an exclusive "or" (one or the other but not both), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The inventive method itself, however, both as to its mode of operation and its application in a motor vehicle, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
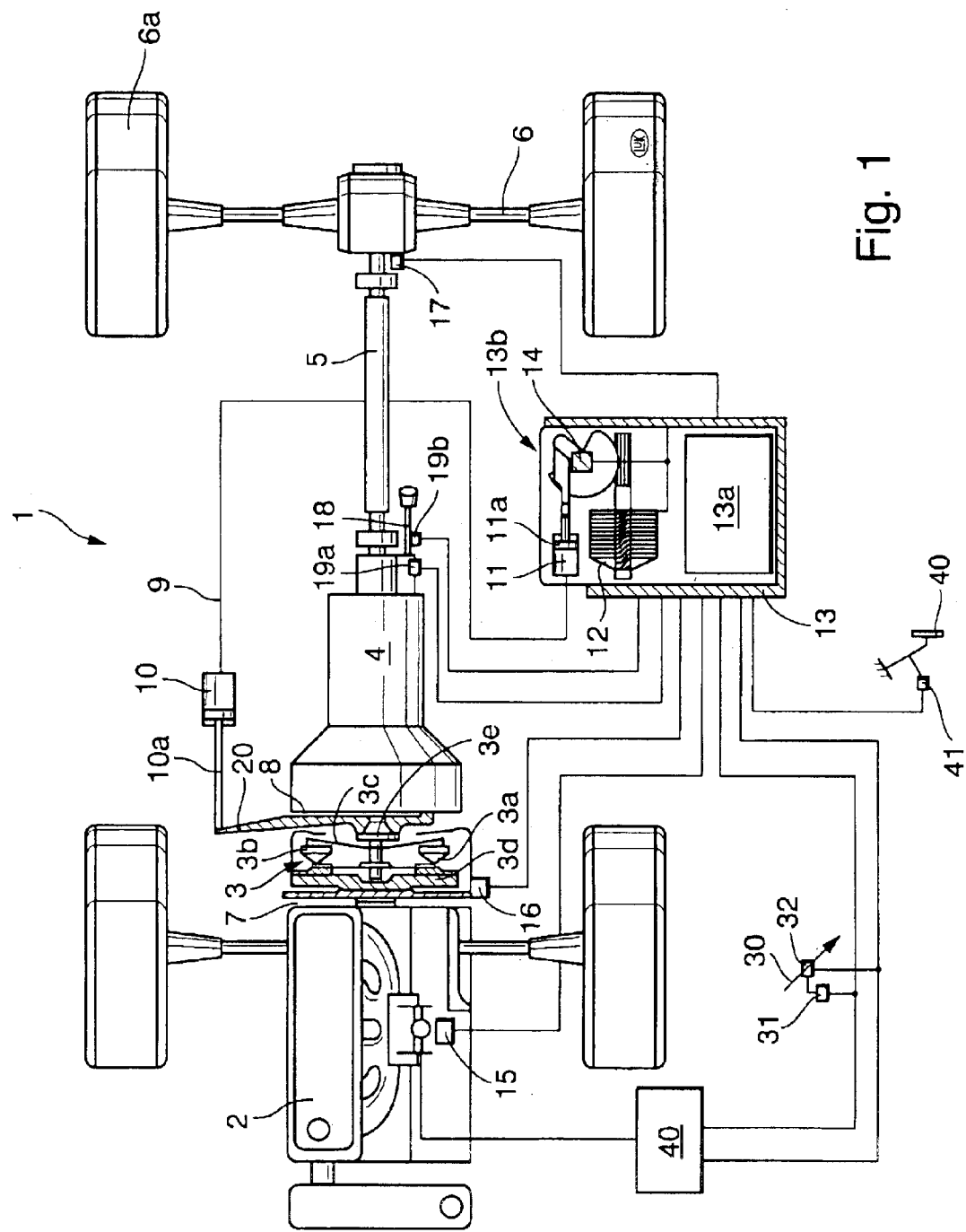
FIG. 1 represents a first exemplary embodiment of the invention in a schematic view.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device. The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19a and 19b. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake. This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

Figure 2:
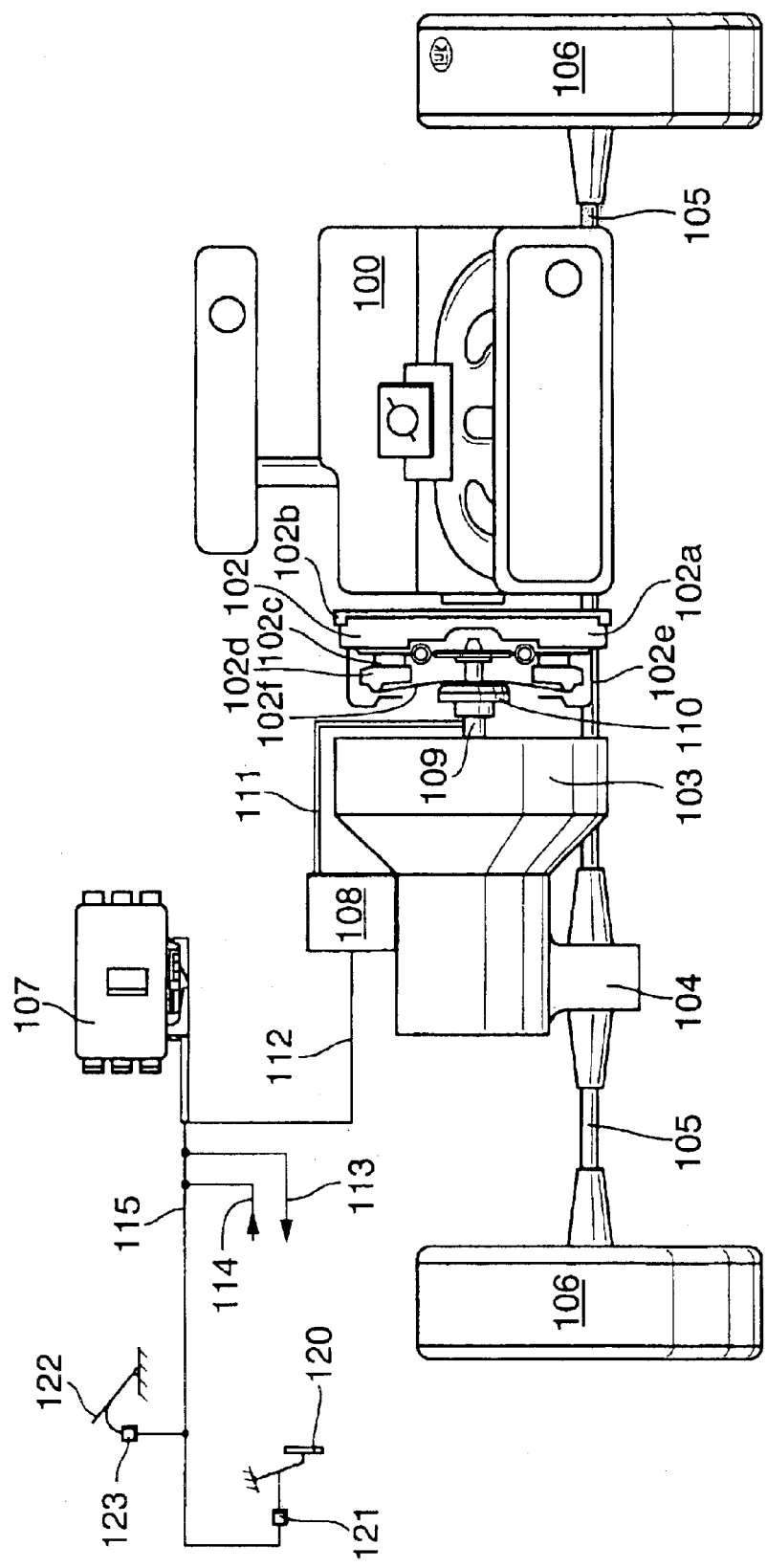
FIG. 2 represents a second exemplary embodiment of the invention in a schematic view.

FIG. 2 gives a schematic view of a power train of a motor vehicle with a drive unit 100, a torque-transmitting device 102, a transmission 103, a differential 104, drive axles 109, and wheels 106. The torque-transmitting device 102 is arranged at or connected to a flywheel 102*a*. The latter as a rule carries an external tooth profile 102*b* that serves to start the engine. The torque-transmitting device has a pressure plate 102*d*, a clutch cover 102*e*, a diaphragm spring 102*f*, and a clutch disc 102*c* with friction linings. The clutch disc 102*c* is interposed between the pressure plate 102*d* and the flywheel 102*a* and may be equipped with a damping device. An energy-storing device such as a diaphragm spring 102*f* pushes the pressure plate axially towards the clutch disc. A clutch-actuating element 109 such as a hydraulically actuated concentric slave cylinder is used to actuate the torque-transmitting device. A release bearing 110 is arranged between the concentric slave cylinder and the prongs of the diaphragm spring 102*f*. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities, for example on the engine torque, that are correlated to the engine rpm rate through a characteristic relationship.

In a start-up process, essentially from a stationary or crawl-speed condition, if the gas pedal is actuated by an amount a, the engine control 40 will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the amount of gas pedal displacement by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The amount of gas pedal displacement is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to a signal indicator device.

Figure 3:
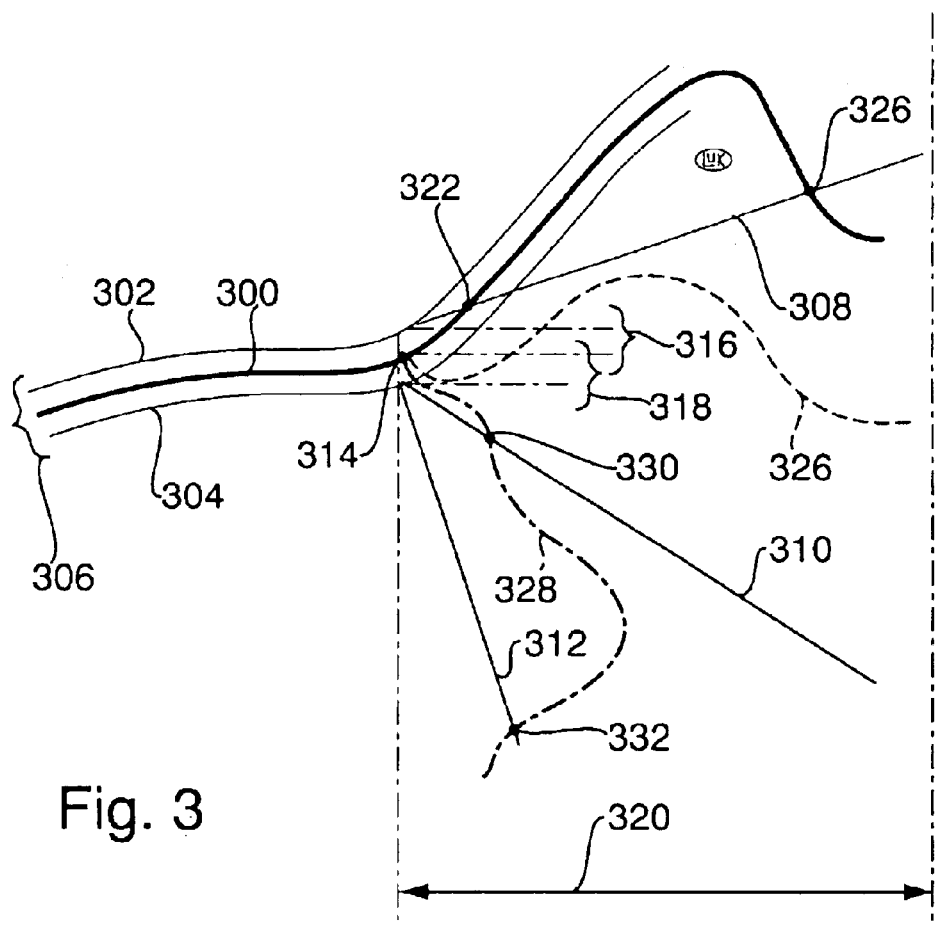
FIG. 3 represents an example of a time graph of detected rpm rates of a wheel to illustrate how the state of rotation of a wheel can be determined according to the invention.

FIG. 3 shows an example of a time graph 300 of a detected wheel rpm rate of a motor vehicle. The lines 302, 304 indicate a bandwidth 306 for the noise of the wheel rpm signal. The line 308 indicates the upper limit for rpm gradients that are compatible with a rolling state of the wheel. The line 310 indicates the lower limit for rpm gradients that are compatible with a rolling state of the wheel. The line 312 indicates the lower limit for rpm gradients that are compatible with a functioning condition of the vehicle. The upper limit 308 for rpm gradients compatible with a rolling condition has a slope which substantially represents the largest possible positive rpm change per unit of time at which the wheels will still adhere to the pavement.

The lower limit 310 for rpm gradients compatible with a rolling condition has a slope which substantially represents the largest possible negative rpm change per unit of time with a full application of the brakes where the wheels still adhere to the pavement.

The lower limit 312 for rpm gradients compatible with a functioning state of the vehicle has a slope corresponding to the largest possible decrease in the rpm rate per unit of time with a full application of the brakes. The limit 312 can be determined, e.g., by a test in which the brakes are applied while the wheels are spinning freely. This test can be performed, e.g., with the vehicle sitting on a lift, so that the wheels are off the ground, or with a full application of the brakes while driving on an ice-covered surface.

The wheel rpm gradients indicated by the lines 308, 310, 312 originate at points that are offset by the amounts 316, 318 from a point 314 on the graph 300 of the detected wheel rpm rate. The respective maximum changes in rpm rates that can occur within a given time interval are obtained as the multiplication products of the slopes of the lines 308, 310, and 312 with the length of the given time interval. An example of a time interval is schematically indicated by the double-headed arrow 320. If, for simplicity, the length of the time interval is assumed to be one unit of time, the vertical rise or decline of the lines 308, 310, 312 over the time interval will correspond to the numerical values of the respective gradient limits. If after the point 314 the rpm rate continues along the curve 300, the start of a spinning condition of the wheels can be expected at point 322, because at this point the curve 300 crosses over the line 308. Above the line 308, the rpm rate remains in the implausible range which in this case represents a spinning condition of the wheel. At the point 324, the rpm rate crosses back below the line 308, so that the average rpm gradient between the points 314 and 324—with an allowance for the offset 316—is less than the slope of the line 308, i.e., the upper limit of rpm gradients compatible with a rolling state of the wheel, and consequently the wheel returns to a rolling condition. If after the point 314, the rpm rate continues along the broken curve 326, it will stay between the upper limit 308 and the lower limit 310 of rolling-compatible rpm gradients, so that the wheel does not lose its rolling condition. If after the point 314, the rpm rate continues along the dash-dotted curve 328, the rpm rate becomes implausible at point 330 with the wheel no longer rolling but not yet locking up because at least up to point 332, the average rpm gradient—with an allowance for the offset 318—is between the lines 310 and 312 representing, respectively, the lower limit of rpm gradients compatible with a rolling state and the lower limit of rpm gradients compatible with the normal functioning of the vehicle.

At the point 332, the rpm gradient—with an allowance for the offset 318—crosses below the lower limit 312 of functionally compatible rpm gradients, so that a failure of the brake sensor can be diagnosed at this point.

Figure 4:
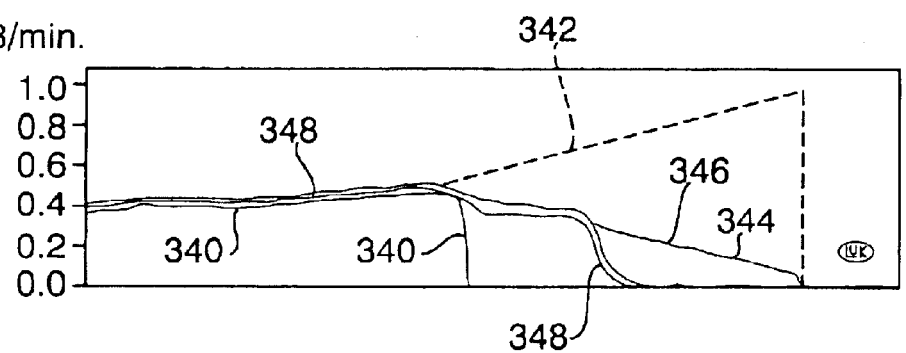
FIG. 4 represents examples of time graphs for characteristic operating values that can occur in a vehicle and which are used to illustrate an example of the inventive method.
Figure 4:
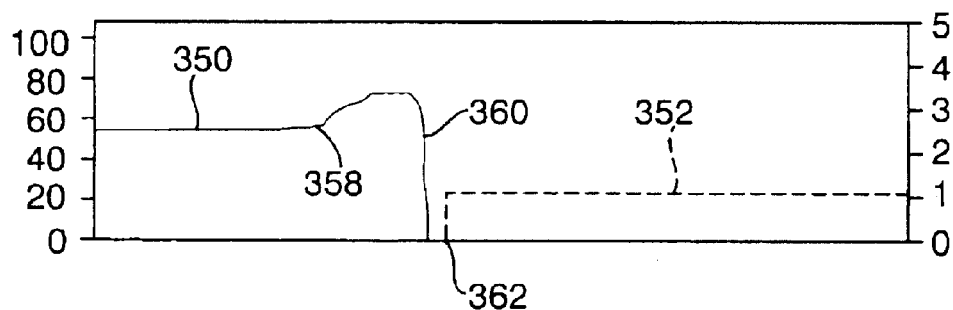
Figure 4:
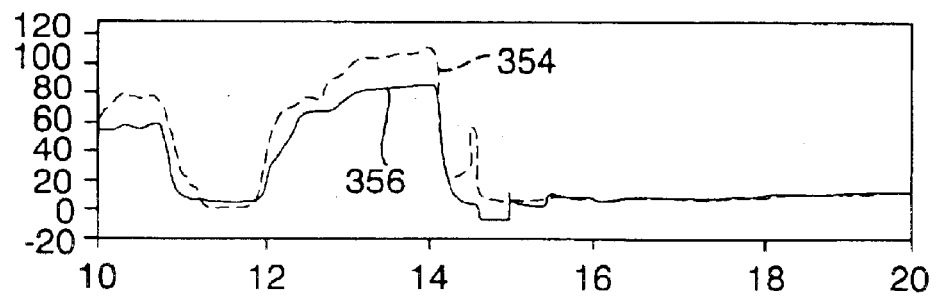

FIG. 4 illustrates the time profiles of different characteristic operating values of a motor vehicle, i.e., a detected rpm rate 340 of the front wheels, the upper limit 342 of an rpm gradient that is compatible with a rolling state, the lower limit 344 of an rpm gradient that is compatible with a rolling state, a substitute wheel rpm rate 346, an rpm rate 348 of a further wheel, particularly a rear wheel, the angle 350 of the gas pedal, a signal 352 indicating actuation of the brakes, a time profile 354 of the clutch torque, and a time profile 356 of the engine torque.

The first activity is an actuation of the gas pedal, as shown in the area 358 of the pedal-angle graph 350. Next, the pedal pressure is taken off (at 360). Beginning at 362, the brake is applied, as illustrated by the jump in the time profile 352 of the brake signal. The curve 340 of the first rpm rate shows an abrupt decline, so that the rpm rate 340 crosses below the bottom limit for rolling-compatible wheel rpm gradients. This condition leads to the conclusion that the wheel is locked.

Figure 5:
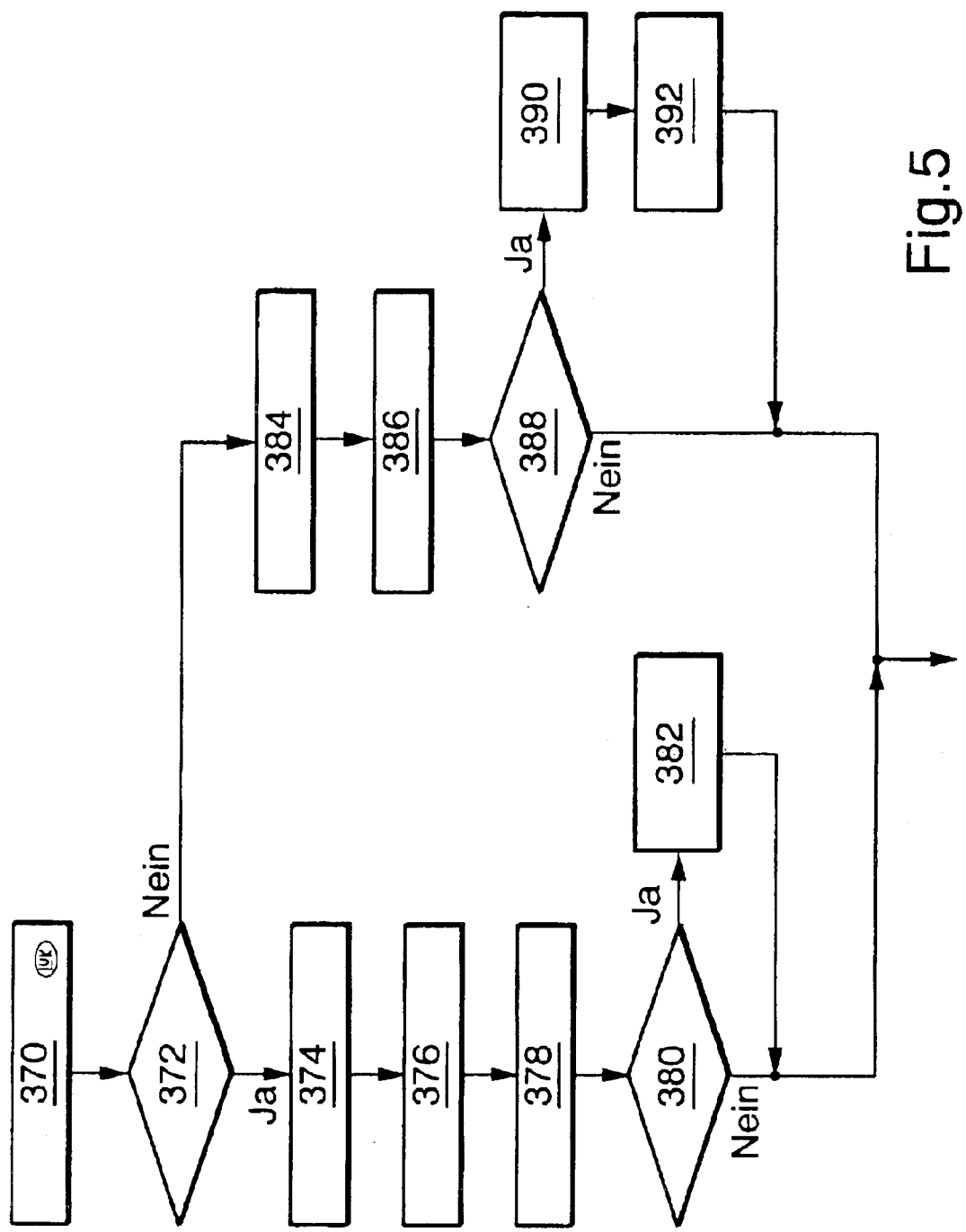
FIG. 5 represents a flow chart of an example of the inventive method.

FIG. 5 illustrates in flowchart format an example of the sequence of steps in a method according to the invention, which allows a determination whether or not a wheel is spinning without adhesion to the pavement. A method of determining whether or not a wheel is locked, as well as a method of determining a sensor failure, can be carried out in an analogous manner.

In step 370, a maximum rpm change is determined that is compatible with a rolling condition. The maximum rpm change is equal to the product of the upper limit value for rolling-compatible rpm gradients with a predetermined length of time. In step 372, a test is made as to whether or not the current wheel rpm rate as measured by a sensor is larger than the sum of a substitute wheel rpm rate and the maximum change of step 370. In the affirmative case, the substitute wheel rpm rate is incremented in step 374 to a value representing the sum of the old rpm rate and the maximum rpm change of step 370. In step 376, a first counter is incremented. In step 378, a second counter is set to zero. In step 380, a test is made whether the value of the first counter exceeds a predetermined value. In the affirmative case, a signal is issued in step 382 that the wheel is spinning without adhesion.

If the test of step 372 indicates that the wheel rpm rate detected by the wheel rpm sensor device does not exceed the sum of the substitute wheel rpm rate and the maximum rpm change of step 370, the second counter is incremented in step 384. The first counter is set to zero in step 386. A test is made in step 388 as to whether or not the second counter exceeds a predetermined value. In the affirmative case, a signal is issued in step 390 that the wheel is not spinning without adhesion. In step 392, the substitute wheel rpm rate is set to a value that corresponds to the sum of the detected rpm rate and the maximum rpm change of step 370.

A failure or error in an rpm signal can thus be recognized by program routines in which the plausibility is tested, and a substitute strategy can be initiated in which the control device manages the power train without the failed rpm signal or even entirely without any wheel rpm signals.

In a reset of the control device, which is entirely possible even during a traveling phase of the vehicle, the aforementioned rpm signals will be lost, because they reside in the volatile working memory of the control device. Thus the lost values will have to be generated anew, which in many cases is possible only under certain conditions. For example, plausibility of a wheel rpm rate can be established only at a time when the clutch is engaged. Because the required conditions do not always exist, it is possible that some plausibility determinations cannot be performed until some time later (when the required conditions are present). In the interim, there is thus no information regarding the plausibility of the affected signals, such as wheel rpm signals. During this time interval, a failed or erroneous signal such as a wheel rpm signal could lead to critical situations. For example, it cannot be ascertained that the engine is working in the non-critical rpm range, a situation that could possible lead to the destruction of the engine.

Figure 6:
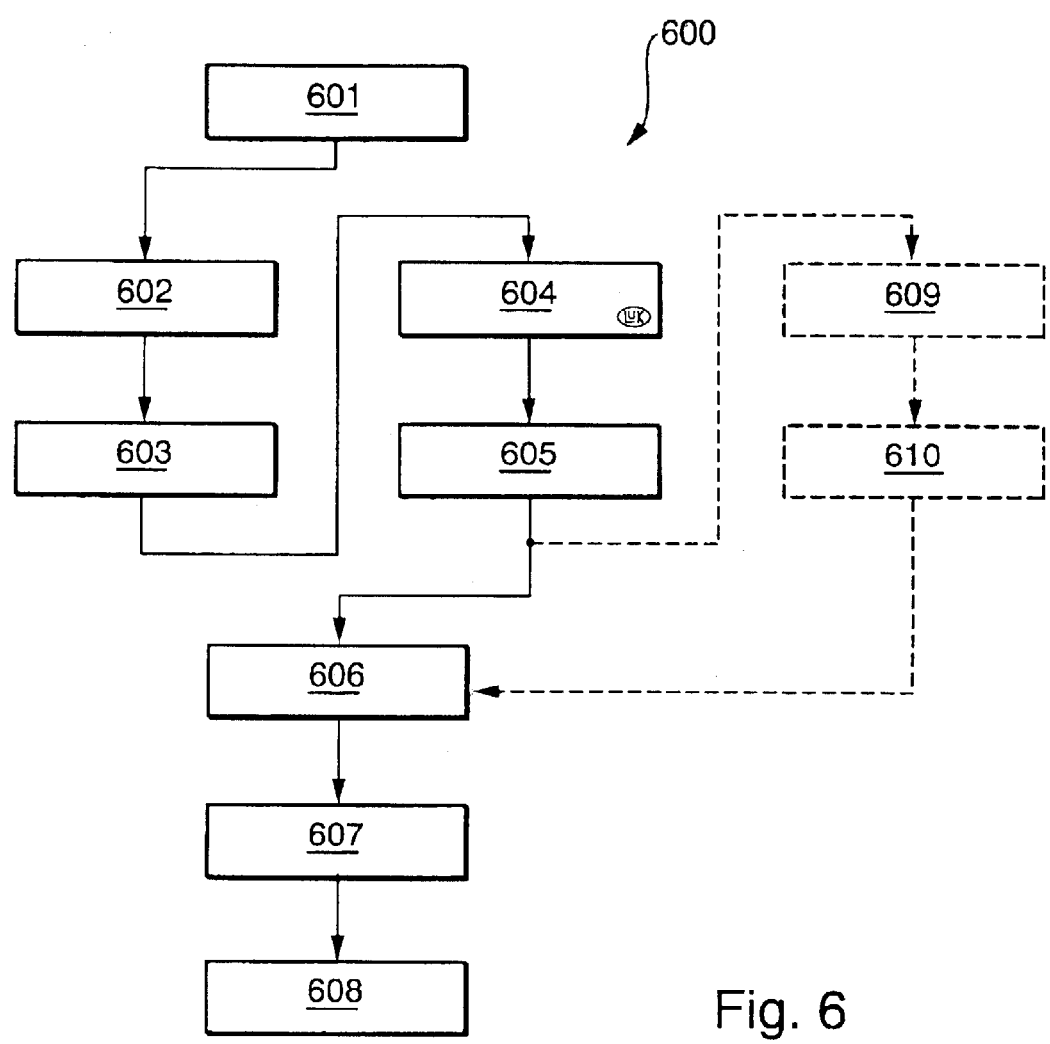
FIG. 6 represents a flow chart of a further example of the inventive method.

FIG. 6 represents a flow chart 600 of an example of the inventive method. The method starts with a plausibility check in step 601. If in step 602, a failure or error of a signal is detected, in this case a faulty wheel rpm signal that is relevant for the safety of the vehicle, information about the error condition of the signal is stored in step 603 in a non-volatile memory, so that the respective information remains available even after a reset of the control device. Any suitable memory device can be used from which data can be retrieved even after a reset of the control device. It is advantageous to use an EEPROM.

Further in the present embodiment, if a failure or error of a first signal has been recognized, information concerning a further signal is acquired in step 604 and stored in the non-volatile memory in step 605. For example, if a failure or error of a wheel rpm signal has been recognized in step 602, information concerning the currently used transmission ratio is acquired in step 604 and stored in the non-volatile memory in step 605.

If or when the control device is reset in step 606, which normally entails a loss of the data in the volatile memory of the control device, the same information remains available from a non-volatile memory. It can thus be retrieved in step 607 and made immediately available to the control device. In particular, the wait for suitable conditions described above, e.g., to perform a suitability test of a wheel rpm rate, can now be avoided.

The information retrieved from non-volatile memory in step 607 can be used directly for control functions, or indirectly as a basis for the determination of other quantities in step 608. For example, in case of a failure or error of a wheel rpm sensor, the vehicle speed can be determined based on wheel rpm information retrieved from the non-volatile memory and from a likewise stored transmission ratio in combination with the current engine rpm rate, and an appropriate substitute strategy can be initiated. The inventive method has been explained here on the basis of a specific example, with the express understanding that the method can also be used for other data, in particular for signals relevant to the safety of the vehicle.

In a further embodiment, it can be advantageous to store information concerning more than only two signals in the non-volatile memory, so that the information remains available even after a reset of the control device. In a particular version of the method, all information is stored in a non-volatile memory, which will be required after a reset of the control device to assure a non-critical or at least only conditionally critical operation of the vehicle. In FIG. 6, step 609 represents the acquisition or detection of a signal of this kind, and step 610 represents the entry of the respective information in the non-volatile memory. In this variation of the method, the sequence of steps does not proceed from step 605 to step 606, but runs through the additional steps 609 and 610 to step 606, where the steps and the process branch 609, 610 are shown in broken lines. The non-volatile memory does not have to be part of the control device. It can be configured as a spatially and/or functionally separate part of the control device, or in can be integrated in another area of the vehicle.

Figure 7:
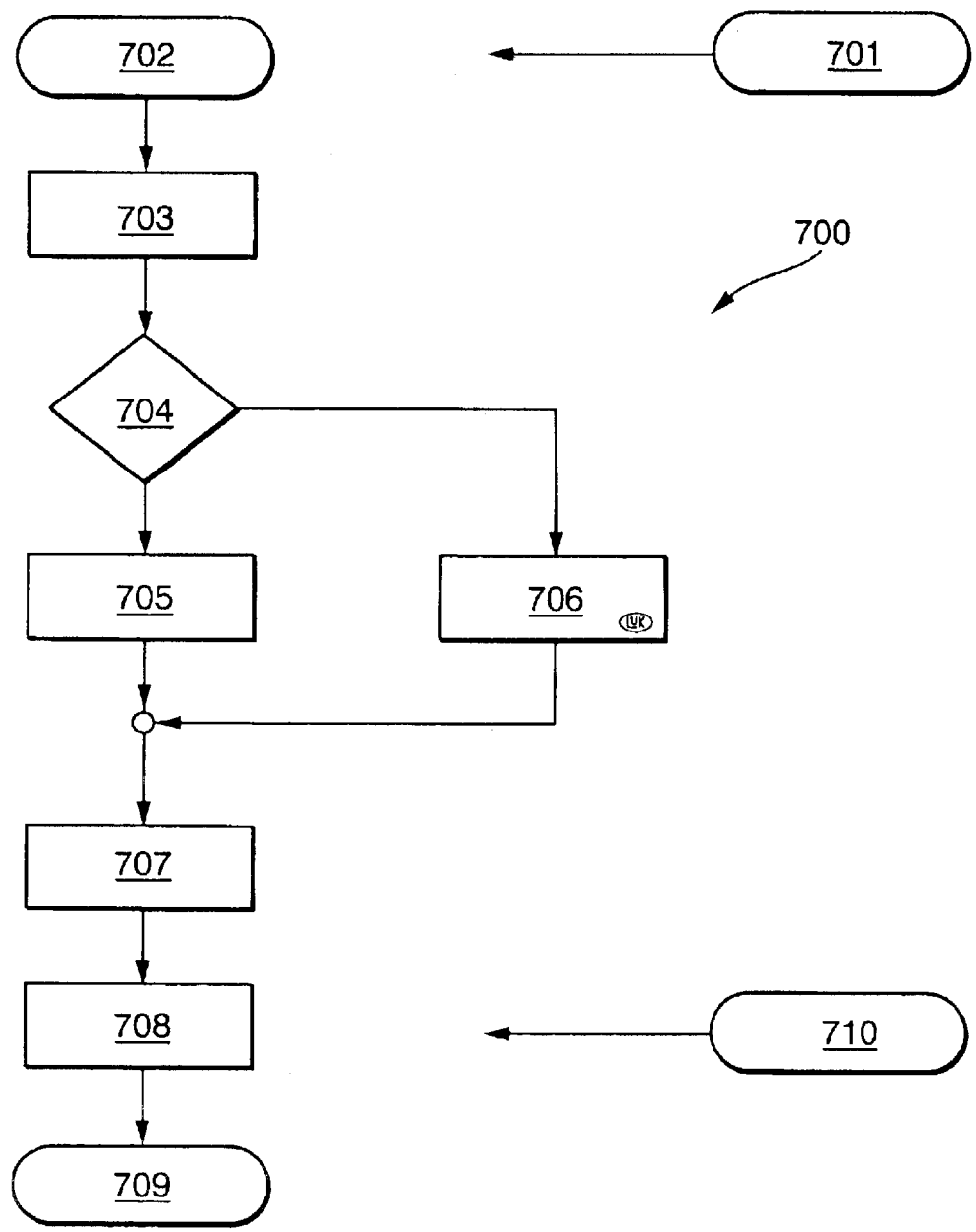
FIG. 7 represents a flow chart for a process of determining that information was stored incompletely or incorrectly.

The flowchart 700 of FIG. 7 represents an example for a process of detecting an incomplete or faulty entry of data into the non-volatile memory. After the ignition has been switched on in step 701, the control device is initialized in step 702. In step 703, the information stored in the non-volatile memory is retrieved, or the retrieval process may find a reset flag indicating an incomplete or faulty storage of information. In step 704, the information is verified, or the reset flag is evaluated. The verification may for example involve a plausibility check. If the reset flag indicates the presence of incomplete or faulty information, or if the information is found implausible, the information in question is generated anew in step 706. For example, the positions of transmission actuator devices are determined by running them to a home position and providing the respective information to the control device in step 707. If the information read from the non-volatile memory in step 704 is found plausible and/or complete and error-free, or if the reset flag indicates that it is, the information is in step 707 released as being usable. At the same time, the non-volatile memory is set to a negative default condition in step 705 by writing implausible and/or incomplete or faulty data into the non-volatile memory, or be setting the reset flag to the binary state that corresponds to incomplete or faulty data. At the time the ignition is switched off in step 710, plausible data regarding signals relevant for the safety of the vehicle are written into the non-volatile memory and, if applicable, the negative state of the reset flag is canceled, so that the presence of complete and error free data is indicated in step 708. Step 709 represents the canceling of the negative default condition.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A method of operating a motor vehicle with an engine, at least one drive axle with at least one wheel, the latter being in contact with a pavement surface, at least one torque transfer arranged in a power train between the engine and the at least one drive axle, and an automated transmission and at least one wheel rpm sensor device for detecting a wheel rpm rate of the at least one wheel; the method comprising the steps of:

determining a transmission input rpm rate free of use of a transmission input rpm sensor and based on the at least one wheel rpm sensor and on a transmission ratio that is effective between the transmission output shaft and the transmission input shaft when a gear is engaged, wherein the transmission input rpm rate is determined by:

calculating a substitute wheel rpm rate according to a predetermined characteristic;

comparing the substitute wheel rpm rate to the detected wheel rpm rate; and determining whether the detected wheel rpm rate is sufficiently reliable to use in calculating a transmission input-rpm rate; and determining, based on the comparison between the substitute wheel rpm rate and the detected wheel rpm rate:

whether the wheel is rolling on the pavement surface;

whether the wheel is spinning while slipping on the pavement surface;

whether the wheel is locked;

whether the wheel rpm sensor device is functioning correctly; and whether the wheel rpm sensor device is functioning incorrectly.

2. The method of claim 1, wherein the steps of determining whether the wheel is rotating on the pavement surface; whether the wheel is spinning while slipping on the pavement surface; and whether the wheel is locked include monitoring and evaluating at least a first characteristic operating value of the at least one wheel to determine whether the detected wheel rpm rate is an implausible rpm rate, an implausible rpm rate being a wheel rpm rate corresponding to one of the conditions where:

the wheel is not rolling while the motor vehicle is moving;

the wheel rpm rate is different from zero while the motor vehicle is standing still;

the wheel rpm rate is zero while the motor vehicle is moving; the method further comprising a step of monitoring at least a second characteristic operating value of the motor vehicle and a second characteristic operating value of at least one wheel to determine in case the wheel rpm rate was found implausible in a first step that includes monitoring and evaluating the first characteristic operating value, whether said wheel rpm rate remains implausible, and to further determine if and when said wheel rpm rate become plausible again;

in case the wheel rpm rate was found plausible in the first step, whether said wheel rpm rate remains plausible, and to further determine if and when said wheel rpm rate becomes implausible.

3. The method of claim 2, further comprising a third step wherein, if the wheel rpm rate was found implausible in at least one of the first step and a second step that includes monitoring and evaluating the second characteristic operating value, a determination is made whether the wheel is spinning while slipping on the pavement surface;

whether the wheel is locked;

whether the wheel rpm sensor device is functioning incorrectly.

4. The method of claim 2, wherein the evaluating in the first step comprises calculating a substitute wheel rpm rate and comparing said substitute wheel rpm rate to said wheel rpm rate.

5. The method of claim 1, further including the steps of:
monitoring and evaluating at least one of the wheel rpm rate and a time gradient of the wheel rpm rate, and wherein determining whether the wheel rpm sensor device is functioning correctly includes at least one comparison of at least one of the wheel rpm rate and the rpm time gradient to at least one functional limit; wherein said at least one functional limit has been determined according to a predetermined characteristic; and wherein further said at least one functional limit represents at least one of a maximum and a minimum value which, based on the laws of physics, cannot be exceeded within a given time interval.

6. The method o claim 5, wherein said at least one functional limit comprises: a functional maximum wheel rpm limit; a functional minimum wheel rpm limit; a functional maximum rpm time gradient limit; a functional minimum rpm time gradient limit.

7. The method of claim 5, wherein the functional maximum rpm time gradient limit consists of an algebraically positive value and the functional minimum rpm time gradient limit consists of an algebraically negative value.

8. The method of claim 1, further including the steps of:
determining a time gradient of the wheel rpm rate and wherein determining whether the at least one wheel is rolling on the pavement surface includes comparing the time gradient of the wheel rpm rate to a maximum- and minimum rpm rolling-compatible time gradient; wherein said wheel is determined as rolling if the time gradient of the wheel rpm rate is at the same time greater than the minimum, and less than the maximum rolling-compatible rpm time gradient.

9. The method of claim 8, wherein when the time gradient of the wheel rpm rate is greater than the maximum rolling-compatible rpm time gradient, the wheel rpm rate will meet the inequality $v<C\times n/60$, and during at least part of a time period when the time gradient of the wheel rpm rate is less than the maximum rolling-compatible rpm time gradient, the wheel rpm rate will meet the equation $v=C\times n/60$ with v standing for a travel velocity the wheel, n standing for the rpm rate of the wheel, and C standing for an outer circumference of the wheel.

10. The method of claim 8, wherein when the time gradient of the wheel rpm rate is less than the minimum rolling-compatible rpm time gradient, the wheel rpm rate will meet the inequality $v>C\times n/60$, and during at least part of a time period when the time gradient of the wheel rpm rate is greater than the minimum rolling-compatible rpm time gradient, the wheel rpm rate will meet the equation $v=C\times n/60$ with v standing for a travel velocity the wheel, n standing for the rpm rate of the wheel, and C standing for an outer circumference of the wheel.

11. The method of claim 8, wherein said wheel is determined as rolling if an additional predetermined condition is met.

12. The method of claim 11, wherein the additional predetermined condition comprises that in a last previous cycle of the method, said wheel was determined to be rolling.

13. The method of claim 8, wherein the maximum rolling-compatible rpm time gradient consists of an algebraically positive value and the minimum rolling-compatible rpm time gradient consists of an algebraically negative value.

14. The method of claim 8, wherein the maximum rolling-compatible rpm time gradient is determined based on a current engine torque and based on a current rpm transfer ratio between the engine and the at least one wheel.

15. The method of claim 8, wherein the motor vehicle comprises a service brake device and wherein the minimum rolling-compatible rpm time gradient is based on a maximum brake torque that the service brake device can apply to the at least one wheel.

16. The method of claim 15, wherein the minimum rolling-compatible rpm time gradient is further based on a predetermined coefficient of friction between the at least one wheel and the pavement surface.

17. The method of claim 8, wherein at least one of the maximum and minimum rolling-compatible rpm time gradients is determined based on at least one characteristic value of the motor vehicle.

18. The method of claim 8, wherein at least one of the maximum and minimum rolling-compatible rpm time gradients is determined based on an inertial force by which at least one element of the power train opposes a motion of the at least one wheel.

19. The method of claim 18, wherein at least one of the maximum and minimum rolling-compatible rpm time gradients is determined based on a transmission ratio that is selectable by shifting at least one transmission device arranged in the power train.

20. The method of claim 8, wherein at least one of the maximum and minimum rolling-compatible rpm time gradients is determined based on an engagement position of at least one clutch device arranged in the power train.

21. The method of claim 8, wherein at least one of the maximum and minimum rolling-compatible rpm time gradients is determined based on a current level of drive power delivered by the engine substantially at the time when said at least one of the maximum and minimum rolling-compatible rpm time gradients is being determined.

22. The method of claim 8, wherein at least one of the maximum and minimum rolling-compatible rpm time gradients is determined based on a maximum level of drive power that the engine is capable of delivering.

23. The method of claim 8, wherein at least one of the maximum and minimum rolling-compatible rpm time gradients is determined based on a current characteristic operating value of the vehicle, said operating value being applicable substantially at the time when said at least one of the maximum and minimum rolling-compatible rpm time gradients is being determined.

24. The method of claim 23, wherein at least one of the maximum and minimum rolling-compatible rpm gradients depends on at least one characteristic operating value of the vehicle in whose presence the wheel rpm gradient limit reaches a predetermined extreme.

25. The method of claim 8, wherein at least one of the maximum and minimum rolling-compatible rpm time gradients is substantially independent of at least one current characteristic operating value of the vehicle while being dependent on a potential characteristic operating value of the vehicle, said potential value being applicable under predetermined conditions that can occur during operation of the vehicle.

26. The method of claim 8, wherein a wheel rpm time gradient is admitted into the comparison only if it was determined in a time interval when the wheel rpm rate changed monotonically from a first wheel rpm rate to a second wheel rpm rate and the difference between said first and second wheel rpm rate exceeded a predetermined threshold difference.

27. The method of claim 8, wherein if the wheel has been determined as not rolling and until the wheel has been determined as rolling again, a substitute wheel rpm rate is used for at least one of the purposes of operating the motor vehicle, determining whether the at least one wheel is rolling, and determining whether the wheel rpm sensor device is functioning correctly.

28. The method of claim 27, wherein the substitute wheel rpm rate is kept constant for a length of time while the substitute wheel rpm rate is being used.

29. The method of claim 27, wherein as long as the substitute wheel rpm rate is in use, the substitute wheel rpm rate is incrementally changed according to a predetermined characteristic.

30. The method of claim 29, wherein said incremental changes are made in an increasing sense if the substitute wheel rpm rate is less than the wheel rpm rate, and in a decreasing sense if the substitute wheel rpm rate is more than the wheel rpm rate.

31. The method of claim 27, wherein the substitute wheel rpm rate is set to a predetermined starting value if the at least one wheel was determined as not rolling.

32. The method of claim 31, wherein the starting value depends on a last previously determined wheel rpm rate that was found to be plausible.

33. The method of claim 27, wherein a rotary state of the at least one wheel is determined by using at least one of the wheel rpm rate detected by the sensor device and a substitute wheel rpm rate, and wherein the rotary state comprises at least one of the states where the wheel is rolling on the pavement surface; the wheel is not rolling on the pavement surface; the wheel is spinning while slipping on the pavement surface; the wheel is locked; the wheel rpm sensor device is functioning incorrectly.

34. The method of claim 33, wherein a determination that the wheel is spinning while slipping on the pavement surface can occur only if at a time of determining the wheel rpm rate, the engine delivers an engine torque greater than zero.

35. The method of claim 33, wherein a determination that the wheel is locked can occur only if at a time of determining the wheel rpm rate, a service brake device of the motor vehicle is being actuated.

36. The method of claim 27, wherein a new substitute wheel rpm rate is determined based on a plausible starting rpm rate, the latter comprising one of a wheel rpm rate, a substitute starting rpm rate and a last previous substitute wheel rpm rate presumed to be plausible, and wherein the new substitute wheel rpm rate depends on at least one of the maximum and minimum rolling-compatible as well as functional rpm time gradient limits.

37. The method of claim 36, wherein the new substitute wheel rpm rate is presumed to be plausible.

38. The method of claim 36, wherein the new substitute wheel rpm rate is determined by calculating a product of a predetermined wheel rpm gradient limit and a length of a predetermined time interval and then calculating a sum of said product and said plausible starting rpm rate, wherein the plausible starting rpm rate is assumed to have been plausible at least at a starting point of said predetermined time interval.

39. The method of claim 38, wherein the new substitute wheel rpm rate is determined by further adding an offset value to said sum, wherein the offset value is of a substantially constant magnitude corresponding substantially to one-half of a noise amplitude of the wheel rpm rate, the offset value being algebraically positive if the predetermined wheel rpm gradient limit in said product represents an upper limit, and algebraically negative if the predetermined wheel rpm gradient limit in said product represents a lower limit.

40. The method of claim 38, wherein the new substitute wheel rpm rate is compared to the wheel rpm rate detected at the end of the predetermined time interval, and wherein based on said comparison a determination is made whether the wheel is rolling on the pavement surface; whether the wheel is spinning while slipping on the pavement surface; whether the wheel is locked; whether the wheel rpm sensor device is functioning correctly; whether the wheel rpm sensor device is functioning incorrectly.

41. The method of claim 40, wherein the method is repeated in continuous cycles in order to continuously monitor the wheel by making said comparison and determination.

42. The method of claim 41, wherein the method comprises determining within each cycle of the method a plurality of new substitute wheel rpm rates based on a plurality of different wheel rpm gradient limits and to make said comparison and determination individually for each of said new substitute wheel rpm rates.

43. The method of claim 41, wherein a result of said determination is accepted after said result has not changed over a predetermined consecutive number of said continuous cycles.

44. The method of claim 8, wherein the time gradients of the wheel rpm rate are determined based on the detected wheel rpm rate.

45. The method of claim 8, wherein the motor vehicle is operated under a control based on the wheel rpm rate.

46. The method of claim 8, wherein at least one characteristic operating value of the motor vehicle is determined based on the wheel rpm rate.

47. The method of claim 8, further comprising a third step in which a traveling speed of the motor vehicle is determined based on the wheel rpm rate.

48. The method of claim 8, wherein the time gradients of the wheel rpm rate are determined as mean time gradients over a predetermined time interval.

49. A method of claim 1, wherein the engine includes a starter motor and a battery and wherein the torque transfer system comprises at least one transmission device and wherein the wheel rpm sensor device comprises an electrical control device, the method further comprising the step of keeping information available concerning at least one signal of relevance for the safety of the vehicle after a reset of the control device has occurred.

50. The method of claim 49, wherein said information concerns an error condition.

51. The method of claim 49, further comprising the step of keeping information available concerning at least one further signal of relevance for the safety of the vehicle after a reset of the control device has occurred.

52. The method of claim 49, wherein said information concerns a currently set ratio of the transmission device.

53. The method of claim 49, wherein said information is stored in a non-volatile memory device.

54. The method of claim 53, wherein the non-volatile memory device is an EEPROM.

55. The method of claim 53, wherein said information is stored at one of the times before and during a critical situation.

56. The method of claim 53, wherein said information is stored before enabling current to flow through the starter motor.

57. The method of claim 53, wherein said information is stored after a finding that the battery is not being charged properly.

58. The method of claim 53, wherein said information is stored when the motor vehicle is standing still.

59. The method of claim 53, wherein said information is retrieved from the non-volatile memory after the reset of the control device.

60. The method of claim 59, wherein the non-volatile memory comprises at least one memory location containing at least a flag indicating whether the information was stored completely and without error.

61. The method of claim 60, wherein said information is retrieved only if said flag indicates that the information was stored completely and without error.

62. The method of claim 60, wherein said information is generated anew if said flag indicates that the information was not stored completely and without error.

63. A method of operating a motor vehicle with an engine, at least one drive axle with at least one wheel, the latter being in contact with a pavement surface, at least one torque transfer system arranged in a power train between the engine and the at least one drive axle, and an automated transmission and a wheel rpm sensor device for detecting a wheel rpm rate of the at least one wheel; the method comprising the step of determining a transmission input rpm rate free of use of a transmission input rpm sensor by determining the transmission input rpm rate based on the at least one wheel sensor and based on a transmission ratio that is effective between the transmission output shaft and the transmission input shaft when a gear is engaged, and wherein the transmission input rpm rate is determined by performing: a first step to determine whether the at least one wheel is rolling at a time when at least one of the conditions applies that the motor vehicle is moving and the gas pedal is being applied; the method further comprising a second step that is carried out if the wheel was found to be not rolling, said second step comprising calculating a substitute wheel rpm rate according to a predetermined characteristic and using said substitute wheel rpm rate for at least one of the purposes of operating the motor vehicle, determining whether the at least one wheel is rolling, and determining whether the wheel rpm sensor device is functioning correctly.

64. The method of claim 63, wherein the determination in the first step comprises determining time gradients of a wheel rpm rate.

65. A method of operating a motor vehicle with an engine, at least one drive axle with at least one wheel, the latter being in contact with a pavement surface, at least one torque transfer arranged in a power train between the engine and the at least one drive axle, and an automated transmission and at least one wheel rpm sensor device for detecting a wheel rpm rate of the at least one wheel; the method comprising the steps of:

determining a transmission input rpm rate free of use of a transmission input rpm sensor by determining the transmission input rpm rate based on the at least one wheel sensor and based on a transmission ratio that is effective between the transmission output shaft and the transmission input shaft when a gear is engaged, and wherein the transmission input rpm rate is determined by evaluating:

whether the wheel is rolling on the pavement surface;

whether the wheel is spinning while slipping on the pavement surface;

whether the wheel is locked;

whether the wheel rpm sensor device is functioning correctly; and whether the wheel rpm sensor device is functioning incorrectly.

* * * * *

UNITED STATES PATENT AND TRADEMARK OFFICE
CERTIFICATE OF CORRECTION

PATENT NO. : 6,834,221 B2
DATED : December 21, 2004
INVENTOR(S) : Thomas Jager et al.

It is certified that error appears in the above-identified patent and that said Letters Patent is hereby corrected as shown below:

<u>Title page,</u>
Item [75], please delete "Klaus Henneberger, Bül (DE)" and substitute
-- Klaus Henneberger, Bühl (DE) --.

Signed and Sealed this

Nineteenth Day of April, 2005

JON W. DUDAS
*Director of the United States Patent and Trademark Office*